US 8,428,555 B2

(12) United States Patent
Kim et al.

(10) Patent No.: US 8,428,555 B2
(45) Date of Patent: Apr. 23, 2013

(54) SECURING QUALITY OF SERVICE (QOS) ACCORDING TO TYPE OF WIRELESS LOCAL AREA NETWORK (WLAN) SERVICE (75) Inventors: Sung-Jun Kim, Seoul (KR); Seong-Joon Jeon, Yongin-si (KR); Joo-Yong Park, Seongnam-si (KR); Myeon-Kee Youn, Incheon (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1165 days.

(21) Appl. No.: 11/523,708

(22) Filed: Sep. 20, 2006

(65) Prior Publication Data
US 2007/0155365 A1  Jul. 5, 2007

(30) Foreign Application Priority Data
Dec. 29, 2005 (KR) .................. 10-2005-0133934

(51) Int. Cl.
H04W 4/00 (2009.01)
(52) U.S. Cl.
USPC ......... 455/411; 455/410; 455/452.2; 370/338
(58) Field of Classification Search .................. 370/310; 455/410, 452.2
See application file for complete search history.

(56) References Cited

U.S. PATENT DOCUMENTS

| 7,031,287 | B1* | 4/2006 | Ho et al. | 370/338 |
|---|---|---|---|---|
| 2001/0025310 | A1* | 9/2001 | Krishnamurthy et al. | 709/223 |
| 2003/0214905 | A1* | 11/2003 | Solomon et al. | 370/229 |
| 2003/0224795 | A1* | 12/2003 | Wilhoite et al. | 455/445 |
| 2004/0068668 | A1* | 4/2004 | Lor et al. | 713/201 |
| 2004/0106403 | A1* | 6/2004 | Mori et al. | 455/426.2 |
| 2005/0047364 | A1* | 3/2005 | Matsukura et al. | 370/328 |
| 2005/0197148 | A1* | 9/2005 | Ali et al. | 455/522 |

FOREIGN PATENT DOCUMENTS

| JP | 2004-179882 | 6/2004 |
|---|---|---|
| KR | 10-2004-0022709 | 3/2004 |
| KR | 10-2006-0026351 | 3/2006 |

OTHER PUBLICATIONS

Korean Office Action corresponding to Korean Patent Application No. 10-2005-0133934, issued on Dec. 8, 2006.
*Technology Trends on Authentication and Key Management in Public WLAN Networks*, by Chung, et al. (2002) (with English abstract).

(Continued)

Primary Examiner — Kamran Afshar
Assistant Examiner — Shahriar Behnamian
(74) Attorney, Agent, or Firm — H.C. Park & Associates, PLC (57) ABSTRACT A wireless network system and method to secure Quality of Service (QoS) according to a type of Wireless Local Area Network (WLAN) service in a WLAN communication system based on IEEE 802.11 includes: an authentication server adapted to set a priority for an access category of a wireless network service requested by a user to perform an authentication procedure in response to a user terminal requesting authentication for access to a wireless network; and an Access Point (AP) adapted to receive and store access category information of the user terminal authenticated by the authentication server and to compare access category information contained in a packet received from the user terminal to the previously stored access category information of the user terminal to control access to the wireless network.

12 Claims, 4 Drawing Sheets

OTHER PUBLICATIONS

Decision of Grant from Korean Intellectual Property Office corresponding to Korean Patent Application No. KR2005-0133934, issued on May 22, 2007.

IEEE Computer Society, "IEEE Standard for Information technology—Telecommunications and information exchange between systems—Local and metropolitan area networks—Specific requirements, Part 11: Wireless LAN Medium Access Control (MAC) and Physical Layer (PHY) Specifications", Jun. 12, 2007, IEEE, New York, NY, USA.

IEEE Computer Society, "IEEE Standard for Local and metropolitan area networks, Port-Based Network Access Control", Dec. 13, 2004, IEEE, New York, NY, USA.

* cited by examiner

SECURING QUALITY OF SERVICE (QOS) ACCORDING TO TYPE OF WIRELESS LOCAL AREA NETWORK (WLAN) SERVICE

CLAIM OF PRIORITY

This application makes reference to, incorporates the same herein, and claims all benefits accruing under 35 U.S.C.§119 from an application for QUALITY OF SERVICE SECURITY SYSTEM AND METHOD FOR SERVICE TYPE OF WIRELESS LOCAL AREA NETWORK earlier filed in the Korean Intellectual Property Office on the 29 Dec. 2005 and there duly assigned Serial No. 10-2005-0133934.

BACKGROUND OF THE INVENTION

1. Field of the Invention

The present invention relates to a system and method for securing Quality of Service (QoS) according to the type of Wireless Local Area Network (WLAN) service in a WLAN communication system based on IEEE 802.11.

2. Description of the Related Art

The existing IEEE 802.11 Media Access Control (MAC) supports a QoS function by a Point Coordination Function (PCF) mechanism which performs polling in a round-robin scheduling method in a Contention Free Period (CFP). However, the IEEE 802.11 MAC has many problems in securing QoS because the PCF occupies a large amount of the bandwidth of the WLAN and cannot exactly anticipate a beacon delay.

At that time when the IEEE 802.11 MAC was designed, various kinds of wireless communication services did not exist and demands on QoS were not much, and thus QoS-related matters did not have a relatively high importance in the IEEE 802.11 MAC. However, various multimedia services such as video services, VoIP telephones, and interactive games have now increased, and it becomes essential to secure QoS in these services. For the foregoing reasons, the IEEE established an IEEE 802.113 standard to secure QoS in the WLAN.

The IEEE 802.11e uses parameter values such as Contention Window (CW, CWmin/CWmax), Backoff Counter (BO), Interframe space-Arbitration Inter Frame Space (AIFS), and transmission opportunity (TXOP) limit to secure QoS in the WLAN. The IEEE 802.11e uses a Hybrid Coordination Function (HCF) mechanism and an Enhanced Distributed Coordination Function (EDCF) mechanism to improve QoS.

For the QoS service, eight User Priorities (UP) and four Access Categories (AC) are used to define a common parameter set for an Enhanced Distributed Channel Access (EDCA). Table 1 below shows a relationship between the user priority and the access category, and Table 2 shows a default EDCA parameter set.

TABLE 1

| User Priority (UP - Same as IEEE 802.1D User Priority) | Access Category (AC) | Designation (Informative) |
| --- | --- | --- |
| 1 | AC_BK | Background |
| 2 | AC_BK | Background |
| 0 | AC_BE | Best Effort |
| 3 | AC_BE | Best Effort |
| 4 | AC_VI | Video |
| 5 | AC_VI | Video |
| 6 | AC_VO | Voice |
| 7 | AC_VO | Voice |

TABLE 2

| AC | CWmin | CWmax | AIFSN | TXOP limit DS-CCK/PBCC | TXOP limit OFDM/CCK-OFDM | TXOP limit Other PHYs |
| --- | --- | --- | --- | --- | --- | --- |
| AC_BK | aCWmin | aCWmax | 7 | 0 | 0 | 0 |
| AC_BE | aCWmin | aCWmax | 3 | 0 | 0 | 0 |
| AC_VI | (aCWmin + 1)/2 − 1 | aCWmin | 2 | 6.016 ms | 3.008 ms | 0 |
| AC_VO | (aCWmin + 1)/4 − 1 | (aCWmin + 1)/2 − 1 | 2 | 3.008 ms | 1.504 ms | 0 |

As shown in Table 1, the IEEE 802.11e standard defines four access categories AC_BK (background), AC_BE (best effort), AC_VI (video), and AC_VO (voice). The four access categories have different parameter values as indicated in Table 2.

In Table 2, when a user sets the access category to the AC_VO, the user has a relatively higher probability of occupying a wireless channel than other users. Thus, users would try to set their access category to the AC_VO having a high priority to increase the probability of occupying a wireless channel. If all the users set to the AC_VO having a high priority, there is no difference in priority among mobile stations located in the same Basic Service Set (BSS), whereby a differentiated QoS service based on the EDCF cannot be provided.

SUMMARY OF THE INVENTION

It is, therefore, an object of the present invention to provide a system and method adapted to secure Quality of Service (QoS) according to a type of Wireless Local Area Network (WLAN) service in which a differentiated QoS service is provided based on IEEE 802.11e in a Basic Service Set (BSS) by using an authentication server that is a component of IEEE 802.1x which controls an Access Category (AC) set by users.

According to one aspect of the present invention, a wireless network system is provided including: an authentication server adapted to set a priority for an access category of a wireless network service requested by a user to perform an authentication procedure in response to a user terminal requesting authentication for access to a wireless network; and an Access Point (AP) adapted to receive and store access category information of the user terminal authenticated by the authentication server and to compare access category information contained in a packet received from the user terminal to the previously stored access category information of the user terminal to control access of the user terminal to the wireless network.

The user terminal is a Quality of Service (QoS) STAtion (QSTA) preferably adapted to perform IEEE 802.11e and IEEE 802.1x functions. The QSTA terminal is preferably adapted to set a security protocol with the AP before performing an IEEE 802.1x authentication procedure with the authentication server.

The authentication server preferably includes a terminal information transmitting module adapted to transmit access category information of a successfully authenticated QSTA to the AP. The access category information of the QSTA preferably includes at least one of AC_VO (voice), AC_VI (video), AC_BK (background), and AC_BE (best effort).

The AP is preferably adapted to manage a QSTA list table by receiving access category information of an authorized QSTA from the authentication server, adding the access category information to the QSTA list table, and deleting a disassociated QSTA from the QSTA list table. The AP is preferably adapted to transmit the preset access category information to the corresponding user terminal during the authentication procedure with the authentication server and then to sequentially increase a mismatch counter value upon a determination that the access category information contained in a QoS control field of the packet received from the user terminal does not match the access category information of the user terminal stored in the QSTA list table. The AP is preferably adapted to forcibly disassociate from the corresponding user terminal in response to the mismatch counter value exceeding a preset reference value. The AP preferably includes: an authenticated terminal list management module adapted to manage access category list information of each terminal authenticated by the authentication server; and a control module adapted to compare the access category information contained in a QoS control field of the packet received from the user terminal to the access category information of the user terminal on the access category list to control access of the corresponding user terminal to the wireless network.

According to another aspect of the present invention, an Access Point (AP) is provided including: an authenticated terminal list management module adapted to manage access category list information of a user terminal authenticated by an authentication server of a wireless network; and a control module adapted to compare access category information contained in a QoS control field of a packet received from the user terminal to access category information of the user terminal on the access category list to control access of the corresponding user terminal to the wireless network.

The authenticated terminal list management module is preferably adapted to manage a terminal list table by receiving access category information of an authorized Quality of Service (QoS) STAtion (QSTA) from the authentication server, adding the access category information to the user terminal list table, and deleting a disassociated user terminal from the terminal list table.

The control module is preferably adapted to transmit the preset access category information to the corresponding terminal and to then sequentially increase a mismatch counter value in response to the access category information contained in a QoS control field of the packet received from the user terminal not matching the access category information of the terminal stored in the terminal list table. The control module is preferably adapted to forcibly disassociate from the corresponding user terminal in response to the mismatch counter value exceeding a preset reference value.

According to still another aspect of the present invention, a wireless network access control method is provide including: determining a priority for an access category of a wireless network service requested by a user to perform an authentication procedure in response to a user terminal requesting authentication for access to a wireless network; receiving access category information of an authenticated user terminal and adding the access category information to a user terminal list table; comparing access category information contained in a packet received from the user terminal to access category information of the terminal stored in the terminal list table; and controlling access of the user terminal to the wireless network in accordance with a result of the comparison.

The access category information of the user terminal preferably includes at least one of AC_VO (voice), AC_VI (video), AC_BK (background), and AC_BE (best effort).

The method preferably further includes transmitting preset access category information to the corresponding user terminal during the authentication procedure with the authentication server in response to the access category information contained in a QoS control field of the packet received from the user terminal not matching the access category information of the user terminal stored in the user terminal list table.

The method preferably further includes sequentially increasing a mismatch counter value after transmitting the preset access category information to the corresponding user terminal.

The method preferably further includes forcibly disassociating from the corresponding user terminal in response to the mismatch counter value exceeding a preset reference value.

The method preferably further includes deleting information of the disassociated user terminal from the user terminal list table.

BRIEF DESCRIPTION OF THE DRAWINGS

A more complete appreciation of the present invention and many of the attendant advantages thereof, will be readily apparent as the present invention becomes better understood by reference to the following detailed description when considered in conjunction with the accompanying drawings in which like reference symbols indicate the same or similar components, wherein.

DETAILED DESCRIPTION OF THE INVENTION

Hereinafter, exemplary embodiments of the present invention are described in detail with reference to the accompanying drawings. In the following description, a detailed description of known functions and configurations incorporated herein has been omitted for conciseness.

Figure 1:
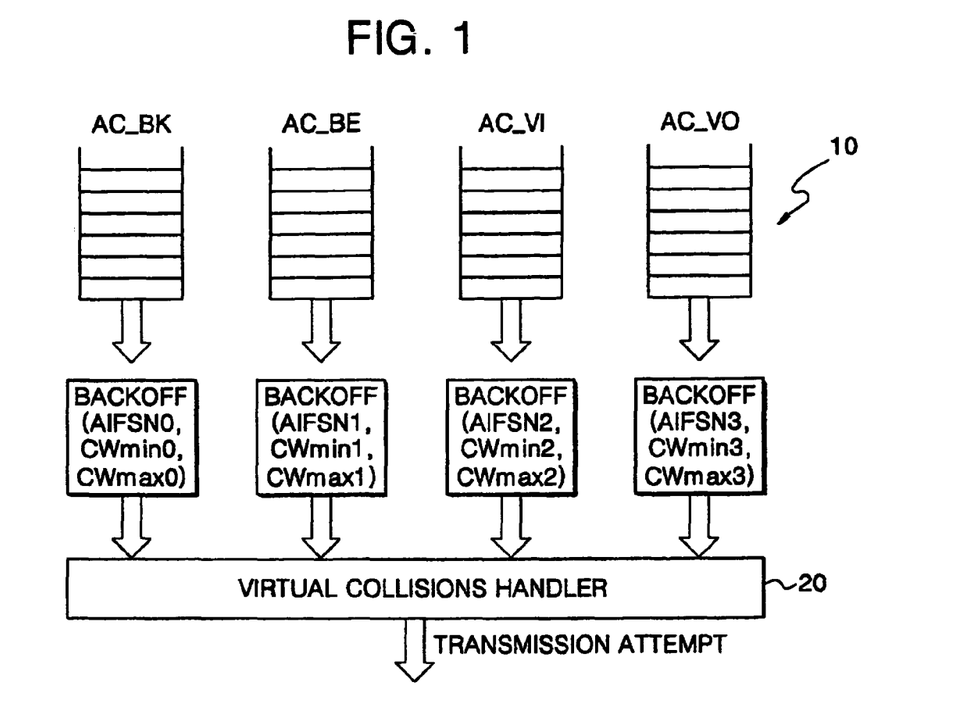
FIG. 1 is an example of the operation of a typical Enhanced Distributed Channel Access (EDCA)

FIG. 1 is an example of the operation of a typical Enhanced Distributed Channel Access (EDCA).

As shown in FIG. 1, an EDCA parameter value of the IEEE 802.11e depends on a service type. Thus, a Quality of Service (QoS) STAtion (QSTA) attempts to access a wireless channel through a buffer 10 in one of four access categories AC_BK, AC_BE, AC_VI, and AC_VO by a parameter value which is determined according to the access category.

That is, in order to secure QoS based on IEEE 802.11e, the EDCA parameter value determined by one of the four access categories is set according to the priority dependent on a service type, and the QSTA attempts to access the wireless channel.

In FIG. 1, the QSTA attempts to access the wireless channel through a Virtual Collisions Handler (VCH) 20 using a Backoff (AIFSN0, CWmin0, CWmax0) value for the AC_BK service, a Backoff (AIFSN1, CWmin1, CWmax1) value for the AC_BE service, a Backoff (AIFSN2, CWmin2, CWmax2) value for the AC_VI service, and a Backoff (AIFSN3, CWmin3, CWmax3) value for the AC_VO service.

Thus, the higher the priority, the smaller the AIFS value. This relatively increases the probability of occupying the wireless channel.

Figure 2:
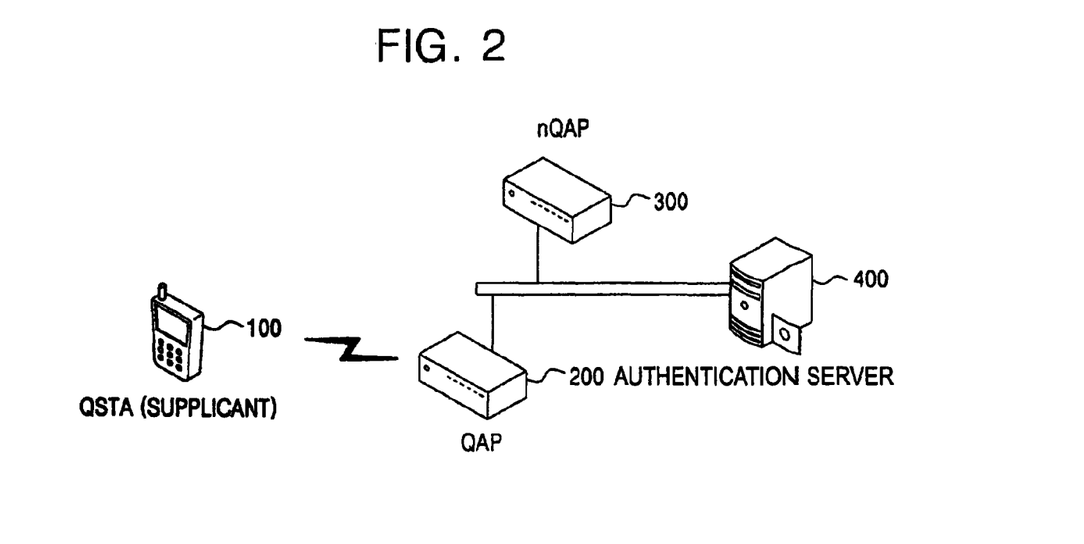
FIG. 2 is a diagram of an IEEE 802.1x system according to an exemplary embodiment of the present invention.
Figure 3:
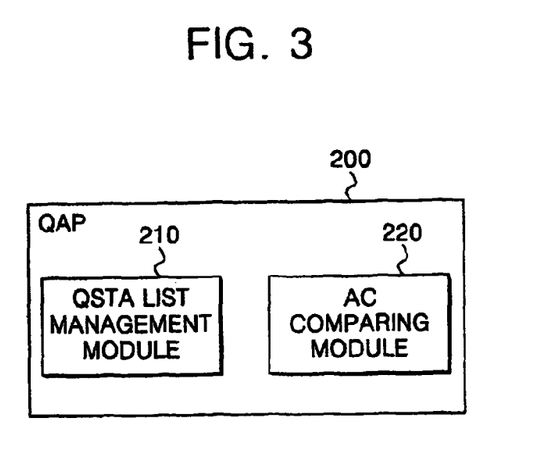
FIG. 3 is a diagram of the configuration of a Quality of Service Access Point (QAP)

FIG. 2 is a diagram of an IEEE 802.1x system according to an exemplary embodiment of the present invention, and FIG. 3 is a diagram of the configuration of a QoS Access Point (QAP).

Referring to FIG. 2, the IEEE 802.1x system of the present invention includes a QoS station (QSTA, supplicant) 100, a QoS AP (QAP) 200, a non-QoS AP (nQAP) 300, and an authentication server 400.

The QSTA 100 is a Wireless Local Area Network (WLAN) terminal having IEEE 802.11e and 802.1x functions. A priority of a wireless communication service is determined by an agreement between the QSTA 100 and the authentication server 400, and the access category and parameter values are determined according to the determined priority.

As shown in FIG. 2, the QSTA 100 desiring the differentiated QoS service has to access a wireless network through the QAP 200 having the QoS function and has to get IEEE 802.1x authentication through the QAP 200 in order to use a network service. The IEEE 802.1x authentication procedure is described later in detail with reference to FIG. 4.

An AP constituting an existing IEEE 802.1x system relays a message between the supplicant and the authentication server during the authentication procedure, whereas the QAP 200 receives QSTA list information as in Table 3 below from the authentication server 400 and stores, manages and continuously updates it. Any communication protocol can be used to transmit information between the QAP 200 and the authentication server 400.

TABLE 3

| QSTA1 | AC_VO |
|---|---|
| QSTA2 | AC_BK |
| . | . |
| . | . |
| . | . |
| QSTAn | AC_BE |

Table 3 is a QSTA list information table. The QAP 200 of the present invention receives the QSTA list information table from the authentication server 400 and stores and manages it. In Table 3, a QSTA1 terminal uses an AC_VO service, a QSTA2 terminal uses an AC_BK service, . . . , a QSTAn terminal uses an AC_BE service.

The QAP 200 receives the QSTA information from the authentication server 400 and continuously updates the QSTA list information. Specifically, the QAP 200 manages the QSTA list by receiving information of QSTAs authenticated by the authentication server 400, adding the information to the QSTA list, and deleting QSTA disassociated from the QAP 200 from the QSTA list.

To this end, the QAP 200 includes a QSTA list management module 210 which adds the QSTA information received from the authentication server 400 to the QSTA list and deletes the disassociated QSTA information from the QSTA list, and an AC comparing module 220 which compares content of the access category set by the QSTA to content of the access category agreed with the authentication server 400 using the QSTA list information, as shown in FIG. 3.

The nQAP 300 is an AP having an authentication function without a QoS function. If the QSTA 100 selects the nQAP, it uses the network through authentication without secured QOS.

The authentication server 400 delivers AC information of the authenticated QSTA to the QAP 200. The authentication server 400 is managed by a communication service provider, and an agreement with the authentication server 400 can include a service fee system chosen by a user.

In particular, the authentication server 400 determines a priority through an agreement with a communication service subscriber, and the priority can be content of a fee system agreement with the subscriber. That is, when a subscriber is successfully authenticated, the authentication server 400 transmits an AC parameter value of the subscriber to the QAP 200. Table 4 below is an example of QSTA management at the authentication server 400.

TABLE 4

| Service fee system 1 | priority 1 | AC_VO | QSTA1 |
|---|---|---|---|
| Service fee system 2 | priority 2 | AC_VI | QSTA3 |
| Service fee system 3 | priority 3 | AC_BE | — |
| Service fee system 4 | priority 4 | AC_BK | QSTA2, QSTA4QSTA5, QSTA6 |

Table 4 indicates a QSTA management table managed by the authentication server 400. In Table 4, the QSTA1 has the first priority and uses an AC_VO service corresponding to the service fee system 1, and the QSTA3 has a second priority and uses an AC_VI service corresponding to a service fee system 2.

The QSTA 2, QSTA 4, QSTA 5, and QSTA 6 have a fourth priority and use a service fee system 4 corresponding to an AC_BK service.

That is, the authentication server 400 transmits, to the QAP 200, the AC information of a terminal which is successfully authenticated based on such a QSTA management table.

Figure 4:
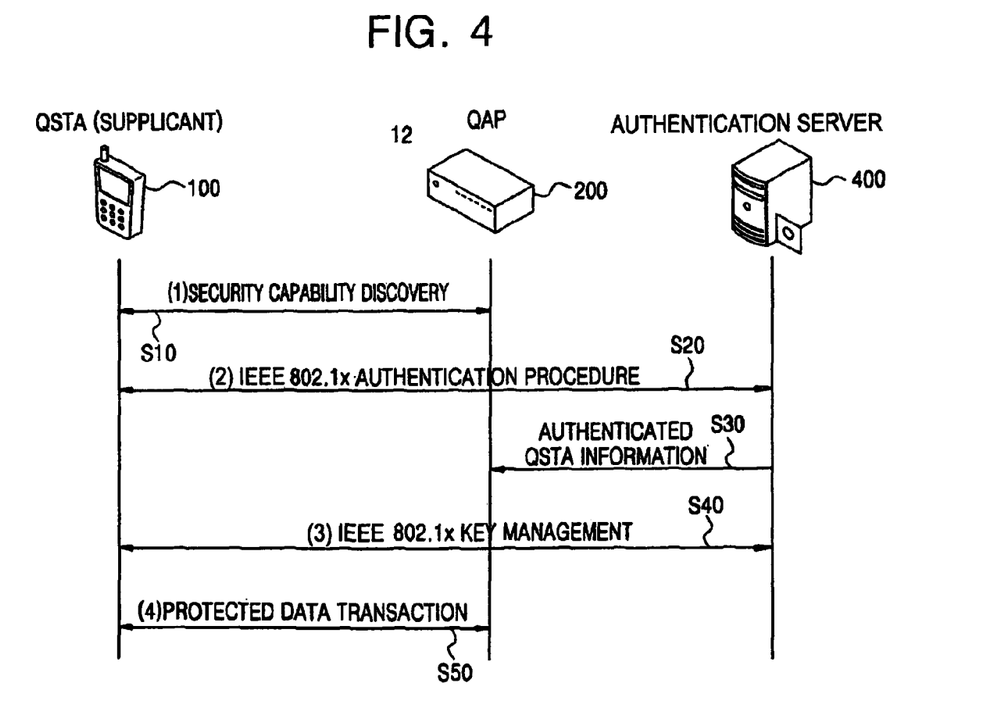
FIG. 4 is an example of IEEE 802.1x authentication and QoS STAtion (QSTA) list information exchange procedures according to an embodiment of the present invention.

FIG. 4 is an example of IEEE 802.1x authentication and QSTA list information exchange procedures according to an embodiment of the present invention.

As shown in FIG. 4, the QSTA 100 desiring a differentiated QoS service has to access a network through the QAP 200 having a QoS function. The QAP 200 receives QSTA information from the authentication server 400 and continuously updates QSTA list information. That is, the QSTA 100 should be IEEE 802.1x authenticated by the authentication server 400 to use the network service through the QAP 200.

In more detail, the QSTA 100 sets a security protocol with the QAP 200 (i.e., security capability discovery) (S10) and then performs the IEEE 802.1x authentication procedure with the authentication server 400 (S20).

When the IEEE 802.1x authentication procedure has been completed, the authentication server 400 transmits the authenticated QSTA information to the QAP 200 (S30), and the QAP 200 stores and manages the QSTA information received from the authentication server 400.

The QSTA 100 shares a key value with the authentication server 400 (i.e., IEEE 802.1x key management) (S40), and transmits data encrypted with the key value, which is shared with the QAP 200 (i.e., protected data transaction) (S50).

Figure 5:
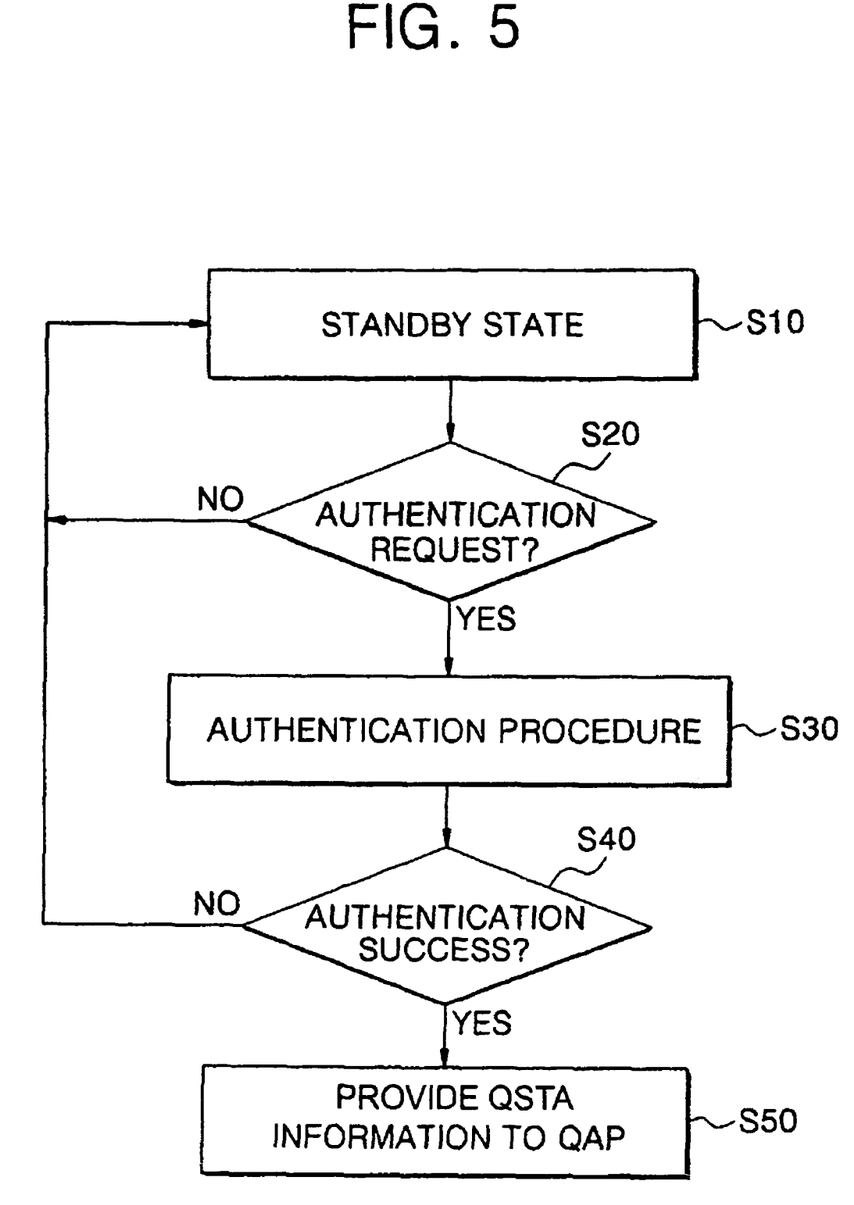
FIG. 5 is a flowchart of the operation of the authentication server according to an embodiment of the present invention.

FIG. 5 is a flowchart of the operation of the authentication server according to an embodiment of the present invention.

As shown in FIG. 5, the authentication server determines in a standby state (S10) whether an authentication request message has been received from the QSTA 100 (S20). When the authentication request message has been received from the QSTA, the authentication server performs the IEEE 802.1x authentication procedure as shown in FIG. 4 (S30).

However, when the authentication request message has not been received from the QSTA, the authentication server returns to the standby state (S10).

The authentication server determines whether the authentication has been successful (S40). When the authentication has been successful, it transmits information of the successfully authenticated QSTA to the QAP (S50).

However, when the authentication has not been successful, the authentication server returns to the standby state (S10).

Figure 6:
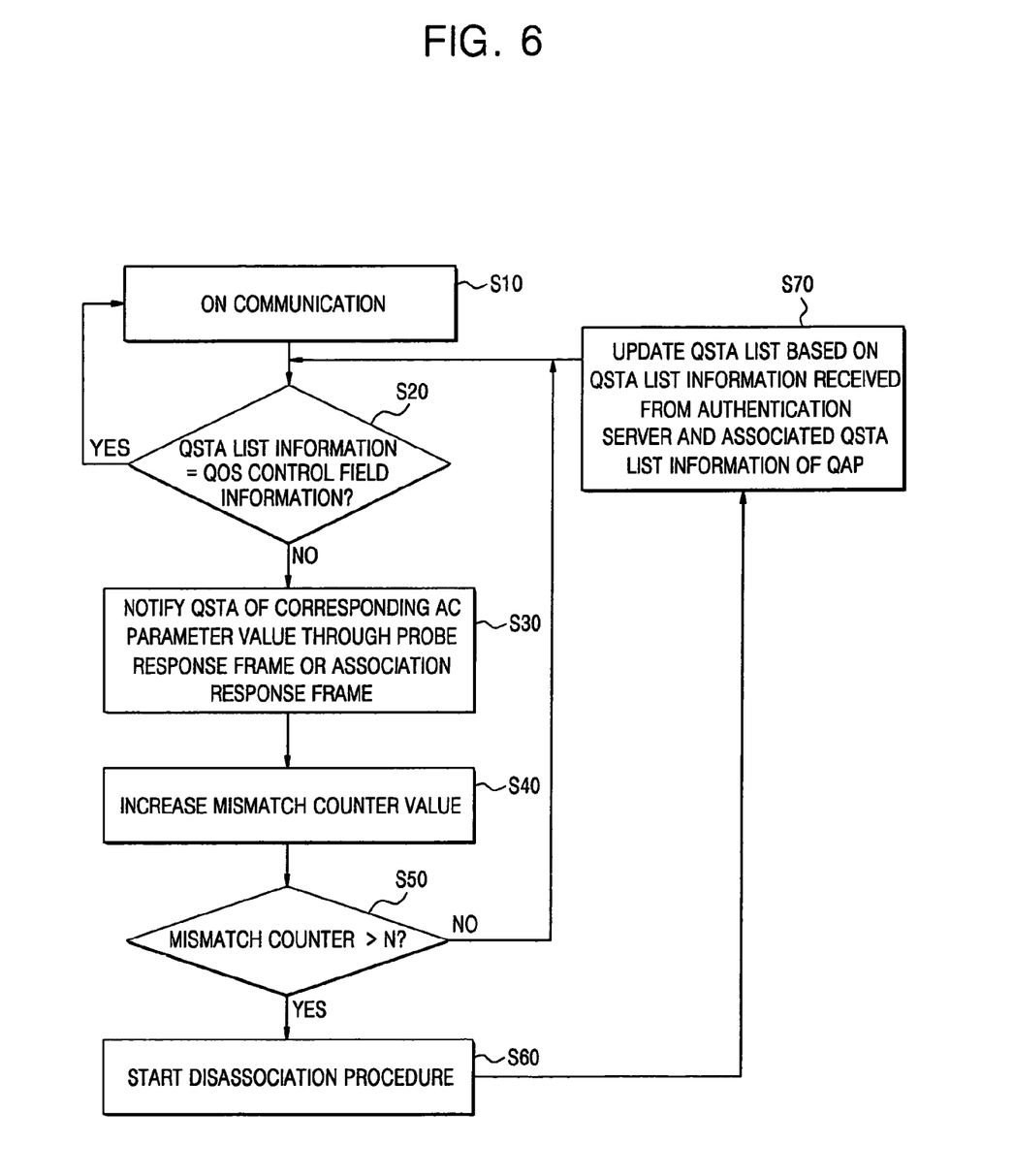
FIG. 6 is a flowchart of the operation of the QAP according to an embodiment of the present invention.

FIG. 6 is a flowchart of the operation of the QAP according to an embodiment of the present invention.

As shown in FIG. 6, during communication between the QSTA and the QAP (i.e., on communication) (S10), when a packet is received from the QSTA, the QAP determines whether information of a pre-agreed QSTA list table which has been received, stored and managed from the authentication server matches information of a QoS control field of the received packet (S20).

When the information of the pre-agree QSTA list table matches the information of the QoS control field of the received packet, the QAP continuously communicates with the corresponding QSTA (S11).

When the information of the pre-agree QSTA list table does not match the information of the QoS control field of the received packet, the QAP notifies the QSTA information (i.e., AC parameter value), which has agreed with the authentication server, to QSTA through a probe response frame or an association response frame (S30).

A mismatch counter value is then increased (S40), and a determination is made as to whether the increased mismatch counter value exceeds a preset value N (S50). N is a reference value which is arbitrarily set to check the number of mismatches between the information of the pre-agreed QSTA list table and the information of the QoS control field of the received packet.

When it has been determined that the increased mismatch counter value exceeds the pre-set N value, i.e., if the mismatch counter value has reached the N value, the QAP forcibly disassociates with QSTA that uses an AC parameter value different from the content previously agreed with the authentication server (S60).

However, when it has been determined that the increased mismatch counter value does not exceed the pre-set N value, the process returns to the step S20 where a determination is made as to whether the information of the pre-agreed QSTA list table which has been received, stored and managed from the authentication server matches information of the QoS control field of the received packet (S20).

After disassociating from the QSTA, the QAP deletes the disassociated QSTA from the QSTA list table based on the QSTA list information received from the authentication server and list information of the associated QSTAs which are currently in communication with itself (S70).

As described above, the priority depends on a service fee system of a user or an agreement with the authentication service instead of a service type. Thus, when an unauthorized user sets an access category which does not match the pre-agreed content to use a wireless channel, an inspector including the authentication server and the QAP controls a connection between the QSTA and the QAP, whereby a differentiated QoS service can be provided through the IEEE 802.11e in the BSS.

As described above, a differentiated QoS service can be provided through the IEEE 802.11e in the BSS by preventing an unauthorized user from setting the AC parameter value through management and inspection of the AC information, which may be set by the unauthorized user.

While the present invention has been described with reference to exemplary embodiments thereof, it will be understood by those skilled in the art that various modifications in form and detail can be made therein without departing from the scope of the present invention as defined by the following claims.

What is claimed is:

1. A wireless network system, comprising:
an authentication server adapted to set a priority for an access category of a wireless network service requested by a user to perform an authentication procedure in response to a user terminal requesting authentication for access to a wireless network; and
an Access Point (AP) adapted to receive and store access category information of the user terminal authenticated by the authentication server and to compare access category information contained in a packet received from the user terminal to the previously stored access category information of the user terminal to control access of the user terminal to the wireless network,
wherein the access category information comprises at least priority information that involves a content of a fee system with one of AC_VO (Access Category voice), AC_VI (Access Category video), AC_BK (Access Category background), and AC_BE (Access Category best effort),
wherein the AP is adapted to manage a Quality of Service Station (QSTA) list table by receiving access category information of an authorized QSTA from the authentication server, adding the access category information to the QSTA list table, and deleting a disassociated QSTA from the QSTA list table, and
wherein the AP is adapted to transmit the preset access category information to the corresponding user terminal during the authentication procedure with the authentication server and then to sequentially increase a mismatch counter value upon a determination that the access category information contained in a Quality of Service (QoS) control field of the packet received from the user terminal does not match the access category information of the user terminal stored in the QSTA list table.

2. The system of claim 1, wherein the user terminal is a Quality of Service (QoS) STAtion (QSTA) adapted to perform IEEE 802.11e and IEEE 802.1x functions.

3. The system of claim 2, wherein the QSTA terminal is adapted to set a security protocol with the AP before performing an IEEE 802.1x authentication procedure with the authentication server.

4. The system of claim 2, wherein the authentication server comprises a terminal information transmitting module adapted to transmit access category information of a successfully authenticated QSTA to the AP.

5. The system of claim 1, wherein the AP is adapted to forcibly disassociate from the corresponding user terminal in response to the mismatch counter value exceeding a preset reference value.

6. The system of claim 1, wherein the AP comprises:
an authenticated terminal list management module adapted to manage access category list information of each terminal authenticated by the authentication server; and
a control module adapted to compare the access category information contained in a QoS control field of the packet received from the user terminal to the access category information of the user terminal on the access category list to control access of the corresponding user terminal to the wireless network.

7. An Access Point (AP), comprising: an authenticated terminal list management module adapted to manage access category list information of a user terminal authenticated by an authentication server of a wireless network; and
a control module adapted to compare access category information contained in a Quality of Service (QoS) control field of a packet received from the user terminal to access category information of the user terminal on the access category list to control access of the corresponding user terminal to the wireless network,
wherein the access category information comprises at least priority information that involves a content of a fee system with one of AC_VO (Access Category voice), AC_VI (Access Category video), AC_BK (Access Category background), and AC_BE (Access Category best effort),
wherein the authenticated terminal list management module is adapted to manage a terminal list table by receiving access category information of an authorized QoS STAtion (QSTA) from the authentication server, adding the access category information to the user terminal list table, and deleting a disassociated user terminal from the terminal list table, and
wherein the control module is adapted to transmit the preset access category information to the corresponding terminal and to then sequentially increase a mismatch counter value in response to the access category information contained in a QoS control field of the packet received from the user terminal not matching the access category information of the terminal stored in the terminal list table.

8. The AP of claim 7, wherein the control module is adapted to forcibly disassociate from the corresponding user terminal in response to the mismatch counter value exceeding a preset reference value.

9. A wireless network access control method, comprising" determining a priority for an access category of a wireless network service requested by a user to perform an authentication procedure in response to a user terminal requesting authentication for access to a wireless network;
receiving access category information of an authenticated user terminal and adding the access category information to a user terminal list table;
comparing access category information contained in a packet received from the user terminal to access category information of the terminal previously stored in the user terminal list table; and
controlling access of the user terminal to the wireless network in accordance with a result of the comparison,
wherein the access category information comprises at least priority information that involves a content of a fee system with one of AC_VO (Access Category voice), AC_VI (Access Category video), AC_BK (Access Category background), and AC_BE (Access Category best effort),
wherein preset access category information is transmitted to the corresponding user terminal during the authentication procedure with the authentication server in response to the access category information contained in a Quality of Service (QoS) control field of the packet received from the user terminal not matching the access category information of the user terminal stored in the user terminal list table, and
to then sequentially increase a mismatch counter value in response to the access category information contained in a QoS control field of the packet received from the user terminal.

10. The method of claim 9, further comprising sequentially increasing the mismatch counter value after transmitting the preset access category information to the corresponding user terminal.

11. The method of claim 10, further comprising forcibly disassociating from the corresponding user terminal in response to the mismatch counter value exceeding a preset reference value.

12. The method of claim 11, further comprising deleting information of the disassociated user terminal from the user terminal list table.

* * * * *